(12) United States Patent
Yang et al.

(10) Patent No.: US 12,526,979 B2
(45) Date of Patent: Jan. 13, 2026

(54) MEMORY AND METHOD FOR MANUFACTURING MEMORY

(71) Applicant: CHANGXIN MEMORY TECHNOLOGIES, INC., Hefei (CN)

(72) Inventors: Mengmeng Yang, Hefei (CN); Jie Bai, Hefei (CN); Deyuan Xiao, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 552 days.

(21) Appl. No.: 17/933,264

(22) Filed: Sep. 19, 2022

(65) Prior Publication Data
US 2023/0011186 A1    Jan. 12, 2023

Related U.S. Application Data

(63) Continuation of application No. PCT/CN2022/097926, filed on Jun. 9, 2022.

(30) Foreign Application Priority Data

Mar. 15, 2022 (CN) .......................... 202210255720.7

(51) Int. Cl.
*H10B 12/00* (2023.01)
*G11C 5/06* (2006.01)

(52) U.S. Cl.
CPC ............. *H10B 12/31* (2023.02); *G11C 5/063* (2013.01); *H10B 12/0335* (2023.02);
(Continued)

(58) Field of Classification Search
CPC .. H10B 12/31; H10B 12/482; H10B 12/0335; H10B 12/05; H10B 12/50; H10B 12/488; H10B 12/09; G11C 5/063
See application file for complete search history.

(56) References Cited

U.S. PATENT DOCUMENTS 10,700,081 B2   6/2020  Oh
10,707,231 B2   7/2020  Park
(Continued)

FOREIGN PATENT DOCUMENTS

CN    102842585 A    12/2012
CN    103022012 A    4/2013
(Continued)

OTHER PUBLICATIONS

Hosono et al, "Novel oxide amorphous semiconductors: transparent conducting amorphous oxides". Journal of Non-Crystalline Solids, 203, 334-344. doi:10.1016/0022-3093(96)00367-5.
(Continued)

*Primary Examiner* — Richard A Booth
(74) *Attorney, Agent, or Firm* — Syncoda LLC; Feng Ma

(57) ABSTRACT

A memory includes a plurality of semiconductor structures stacked onto one another. Each of the plurality of semiconductor structures include: a first base including a peripheral circuit structure; a first integrated circuit layer disposed on the first base and electrically connected to the peripheral circuit structure; and a second base disposed on the first integrated circuit layer. A first dielectric layer is disposed between the first integrated circuit layer and the second base. The second base includes a storage circuit structure. Each of the first base and the second base includes a semiconductor layer.

17 Claims, 16 Drawing Sheets

(52) U.S. Cl.
CPC ............. *H10B 12/05* (2023.02); *H10B 12/09* (2023.02); *H10B 12/482* (2023.02); *H10B 12/488* (2023.02); *H10B 12/50* (2023.02)

(56) References Cited

U.S. PATENT DOCUMENTS

| | | | |
|---|---|---|---|
| 10,804,194 B2 | 10/2020 | Zhang | |
| 2005/0280061 A1 | 12/2005 | Lee | |
| 2011/0140116 A1* | 6/2011 | Morosawa | H10D 30/6739 257/E29.273 |
| 2012/0193628 A1* | 8/2012 | Sasaki | H10D 62/405 257/59 |
| 2013/0069132 A1* | 3/2013 | Atsumi | H10B 12/03 257/734 |
| 2019/0051599 A1 | 2/2019 | Zhang et al. | |
| 2019/0312051 A1 | 10/2019 | Park et al. | |
| 2019/0319038 A1 | 10/2019 | Zhang | |
| 2020/0058670 A1 | 2/2020 | Oh | |
| 2020/0328186 A1 | 10/2020 | Liu | |
| 2021/0296319 A1 | 9/2021 | Sukekawa | |

FOREIGN PATENT DOCUMENTS

| | | |
|---|---|---|
| CN | 108346664 A | 7/2018 |
| CN | 109390272 A | 2/2019 |
| CN | 110349970 A | 10/2019 |
| CN | 110364535 A | 10/2019 |
| CN | 110838317 A | 2/2020 |
| CN | 112687678 A | 4/2021 |
| CN | 112768451 A | 5/2021 |
| CN | 113964127 A | 1/2022 |

OTHER PUBLICATIONS

Yamazaki, S et al., "Crystalline IGZO Ceramics (Crystalline Oxide Semiconductor)-based Devices for Artificial Intelligence". International Journal of Ceramic Engineering & Science. doi:10.1002/ces2. 10005.

Nomura, K. (2003). "Thin-Film Transistor Fabricated in Single-Crystalline Transparent Oxide Semiconductor". Science, 300(5623), 1269-1272. doi:10.1126/science.1083212.

Tatsuya Onuki et al, "DRAM with Storage Capacitance of 3.9 fF using CAAC-OS Transistor with L of 60 nm and having More Than 1-h Retention Characteristics". 2014 International Conference on Solid State Devices and Materials Sep. 8-Sep. 11, 2014 Tsukuba International Congress Center (Epochal Tsukuba), Ibaraki, Japan.

Belmonte, A et al, "Capacitor-less, Long-Retention (>400s) DRAM Cell Paving the Way towards Low-Power and High-Density Monolithic 3D DRAM". 2020 IEEE International Electron Devices Meeting (IEDM). doi:10.1109/edm13553.2020.9371900.

Supplementary European Search Report in the European application No. 22792732.4, mailed on Oct. 19, 2023. 9 pages.

* cited by examiner

MEMORY AND METHOD FOR MANUFACTURING MEMORY

CROSS-REFERENCE TO RELATED APPLICATIONS

This application is a continuation application of International Patent Application No. PCT/CN2022/097926 filed on Jun. 9, 2022, which claims priority to Chinese Patent Application No. 202210255720.7 filed on Mar. 15, 2022. The disclosures of the above-referenced applications are hereby incorporated by reference in their entirety.

BACKGROUND

In a Dynamic Random Access Memory (DRAM), a peripheral circuit structure and a storage circuit structure are generally formed on a same substrate, resulting in great increasing of manufacturing costs due to large required area of the substrate.

In addition, in the above conventional DRAM structure, a memory is large in volume and low in array efficiency.

SUMMARY

Embodiments of the disclosure relate to, but are not limited to, a memory and a method for manufacturing a memory.

Embodiments of the disclosure provide a memory. The memory includes a plurality of semiconductor structures stacked onto one another.

Each of the plurality of semiconductor structures stacked onto one another includes a first base, a first integrated circuit layer, and a second base.

The first base includes a peripheral circuit structure.

The first integrated circuit layer is disposed on the first base and electrically connected to the peripheral circuit structure.

The second base is disposed on the first integrated circuit layer. A first dielectric layer is disposed between the first integrated circuit layer and the second base. The second base includes a storage circuit structure.

Each of the first base and the second base includes a semiconductor layer.

Embodiments of the disclosure further provide a method for manufacturing a memory. The method includes the following operations.

A first base is formed, where the first base includes a peripheral circuit structure.

A first integrated circuit layer is formed on the first base, where the first integrated circuit layer is electrically connected to the peripheral circuit structure.

A first dielectric layer is formed on the first integrated circuit layer.

A second base is formed on the first dielectric layer, where the second base includes a storage circuit structure.

Each of the first base and the second base includes a semiconductor layer.

DETAILED DESCRIPTION

Figure 1:
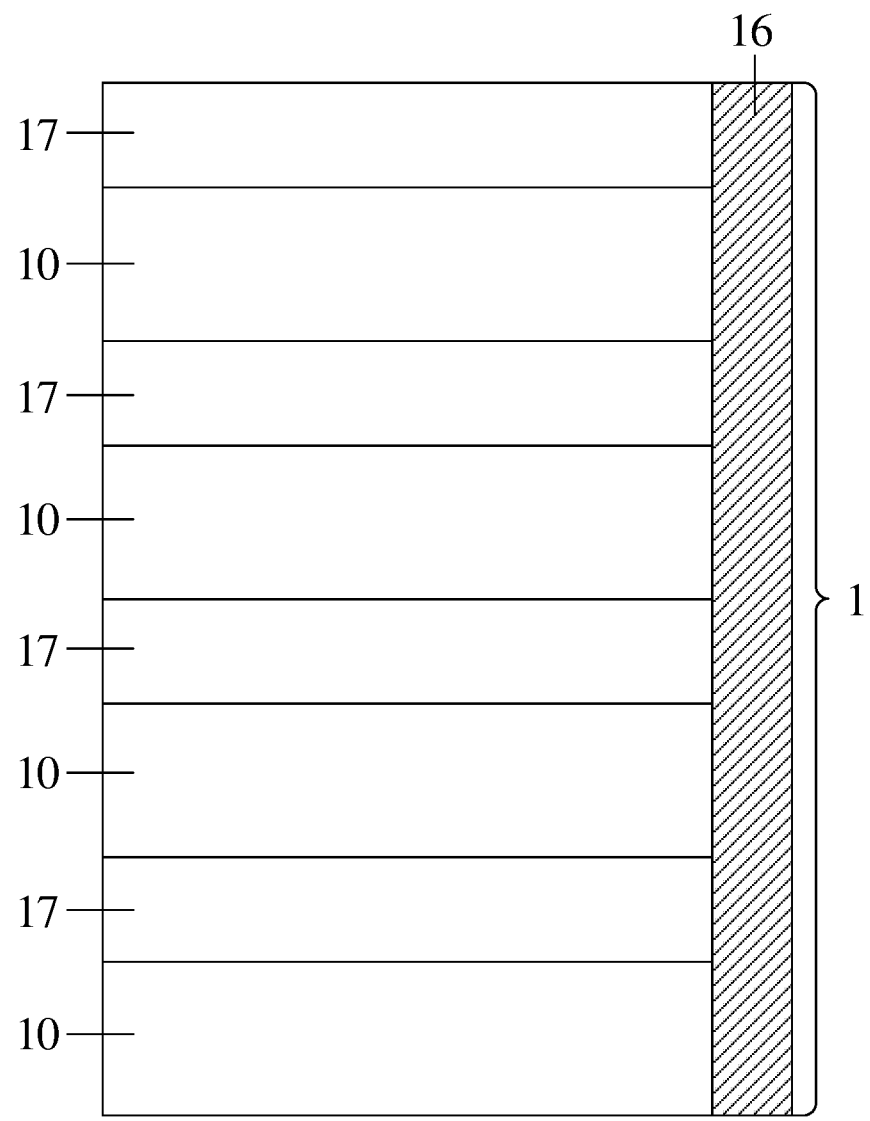
FIG. 1 is a schematic diagram of a memory according to an embodiment of the disclosure.

Exemplary embodiments disclosed in the disclosure are described in more detail with reference to drawings. Although the exemplary embodiments of the disclosure are shown in the drawings, it should be understood that the disclosure may be implemented in various forms and should not be limited by the specific embodiments described here. On the contrary, these embodiments are provided for more thorough understanding of the disclosure, and to fully convey a scope disclosed in the embodiments of the disclosure to a person skilled in the art.

In the following descriptions, a lot of specific details are given in order to provide the more thorough understanding of the disclosure. However, it is apparent to a person skilled in the art that the disclosure may be implemented without one or more of these details. In other examples, in order to avoid confusion with the disclosure, some technical features well-known in the art are not described. Namely, all the features of the actual embodiments are not described here, and well-known functions and structures are not described in detail.

In the drawings, the dimensions of a layer, a region, and an element and their relative dimensions may be exaggerated for clarity. The same reference numeral represents the same element throughout the description.

It should be understood that when an element or layer is referred to as being "on", "adjacent to", "connected to" or "coupled to" other elements or layers, it may be directly on the other elements or layers, adjacent to, connected or coupled to the other elements or layers, or an intermediate element or layer may be existent. In contrast, when the element is referred to as being "directly on", "directly adjacent to", "directly connected to" or "directly coupled to" other elements or layers, the intermediate element or layer is not existent. It should be understood that although terms first, second, third and the like may be used to describe various elements, components, regions, layers and/or sections, these elements, components, regions, layers and/or sections should not be limited by these terms. These terms are only used to distinguish one element, component, region, layer or section from another element, component, region, layer or section. Therefore, without departing from the teaching of the disclosure, a first element, component, region, layer or section discussed below may be represented as a second element, component, region, layer or section. When the second element, component, region, layer or section is discussed, it does not mean that the first element, component, region, layer or section is necessarily existent in the disclosure.

Spatial relation terms, such as "under", "below", "lower", "underneath", "above", "upper" and the like, may be used here for conveniently describing so that a relationship between one element or feature shown in the drawings and other elements or features is described. It should be understood that in addition to orientations shown in the drawings, the spatial relationship terms are intended to further include the different orientations of a device in use and operation. For example, if the device in the drawings is turned over, then the elements or the features described as "below" or "underneath" or "under" other elements may be oriented "on" the other elements or features. Therefore, the exemplary terms "below" and "under" may include two orientations of up and down. The device may be otherwise oriented (rotated by 90 degrees or other orientations) and the spatial descriptions used here are interpreted accordingly.

A purpose of the terms used here is only to describe the specific embodiments and not as limitation to the disclosure. Herein, singular forms of "a", "an" and "said/the" are also intended to include plural forms, unless the context clearly indicates another mode. It should also be understood that terms "composition" and/or "including", while used in the description, determine the existence of the described features, integers, steps, operations, elements and/or components, but do not exclude the existence or addition of one or more other features, integers, steps, operations, elements, components, and/or groups. As used herein, a term "and/or" includes any and all combinations of related items listed.

In a memory, such as a DRAM, a peripheral circuit structure and a storage circuit structure are generally formed on different areas of a same substrate. When the layout or occupied area of at least one of the peripheral circuit structure or the storage circuit structure changes, the area of a substrate is increased or decreased. In a case that the area of the substrate cannot be randomly changed, the above changes will greatly increase the workload of designers.

In addition, for a structure in which the peripheral circuit structure and the storage circuit structure are formed on the same substrate, the required area of the substrate is relatively large, resulting in great increasing of manufacturing costs, large volume and low array efficiency of the memory.

Based on this, the following technical solutions of the embodiments of the disclosure are provided.

An embodiment of the disclosure provides a memory.

The memory includes a plurality of semiconductor structures stacked onto one another.

Each of the plurality of semiconductor structures stacked onto one another includes a first base, a first integrated circuit layer, and a second base.

The first base includes a peripheral circuit structure.

The first integrated circuit layer is disposed on the first base and electrically connected to the peripheral circuit structure.

The second base is disposed on the first integrated circuit layer. A first dielectric layer is disposed between the first integrated circuit layer and the second base. The second base includes a storage circuit structure.

Each of the first base and the second base includes a semiconductor layer.

The memory provided in this embodiment of the disclosure includes the plurality of semiconductor structures stacked onto one another, so that the integration of the memory may be effectively enhanced. In addition, the peripheral circuit structure in each of the plurality of semiconductor structures is located in the first base and the storage circuit structure in each of the plurality of semiconductor structures is located in the second base. The first base and the second base are distributed longitudinally, so that the volume of the memory may be significantly reduced, and the array efficiency of the memory may be enhanced. In addition, the first integrated circuit layer and the first dielectric layer are also successively disposed between the first base and the second base. The first integrated circuit layer is configured to form an electric connection between the peripheral circuit structure and the storage circuit structure, and the first dielectric layer is configured to form a desirable electrical isolation effect in areas where the electric connection is not required. Therefore, compared with a conventional structure, the memory provided in this embodiment of the disclosure has higher integration and array efficiency, and has a smaller dimension.

In order to make the above purposes, features and advantages of the disclosure more obvious and easy to understand, specific implementations of the disclosure are described below in detail with reference to the drawings. While the embodiments of the disclosure are described in detail, for ease of descriptions, a schematic diagram may not be partially enlarged according to a general scale, and the schematic diagram is only an example and should not limit a scope of protection of the disclosure herein.

Figure 2:
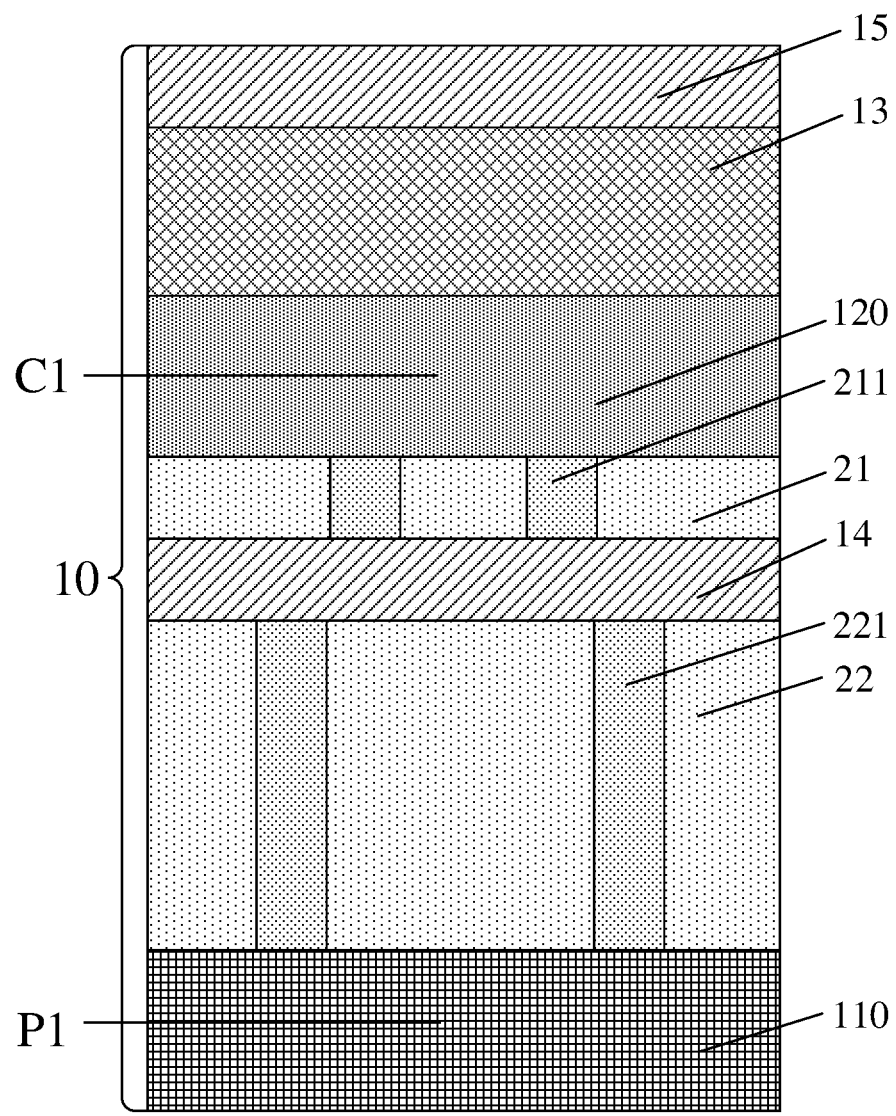
FIG. 2 is a schematic diagram of a semiconductor structure according to an embodiment of the disclosure.
Figure 3:
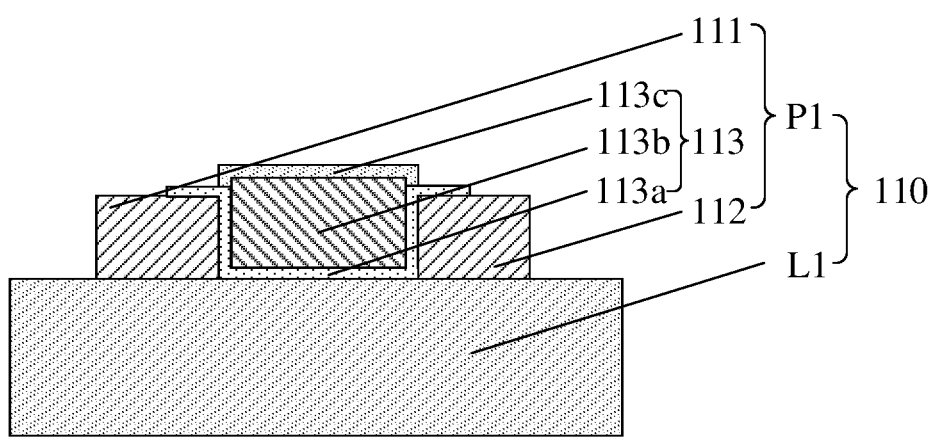
FIG. 3 is a schematic diagram of a first base according to an embodiment of the disclosure.
Figure 4A:
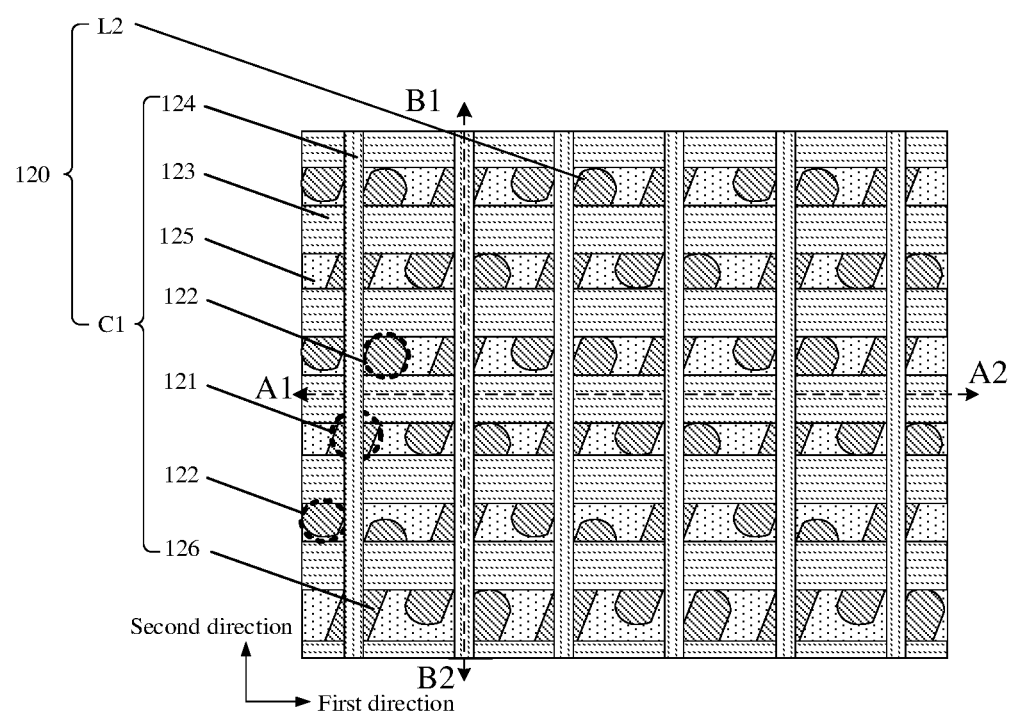
FIG. 4A is a schematic top view of a second base according to an embodiment of the disclosure.
Figure 4B:
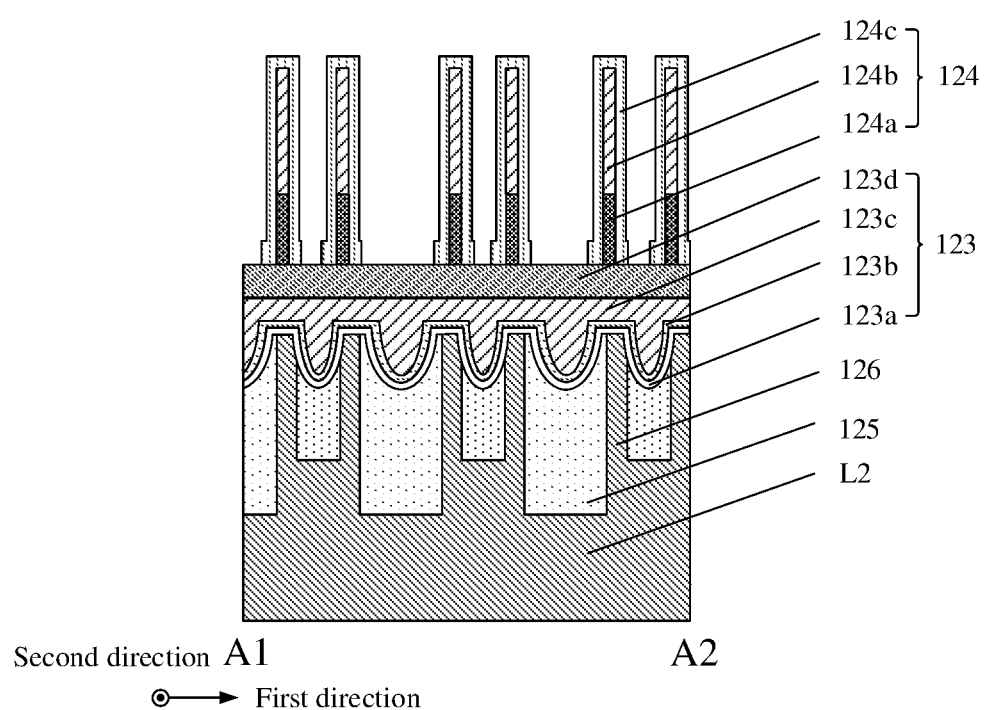
FIG. 4B is a detailed cross-sectional view of the second base along an A1-A2 direction of FIG. 4A according to an embodiment of the disclosure.
Figure 4C:
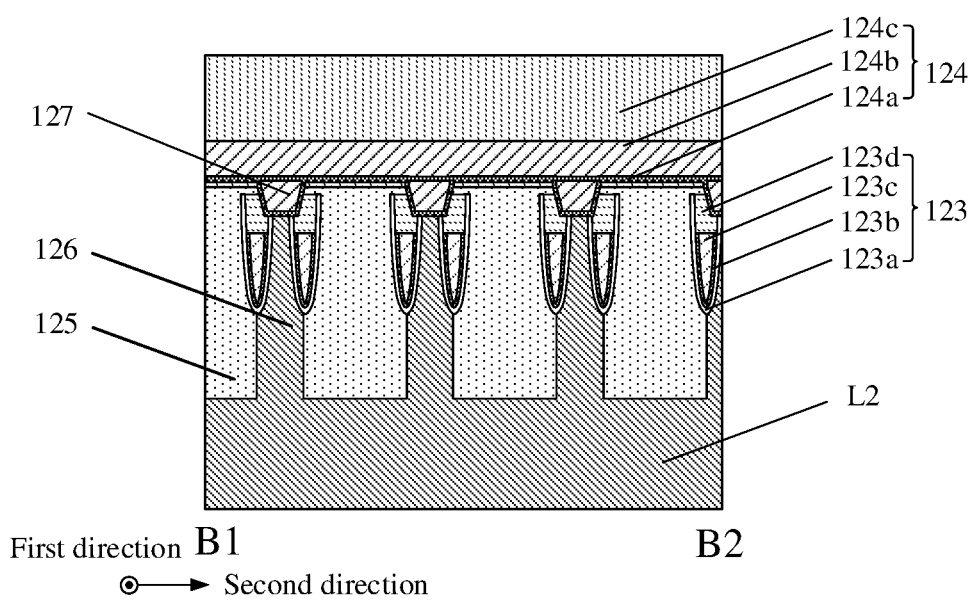
FIG. 4C is a detailed cross-sectional view of the second base along a B1-B2 direction of FIG. 4A according to an embodiment of the disclosure.
Figure 5:
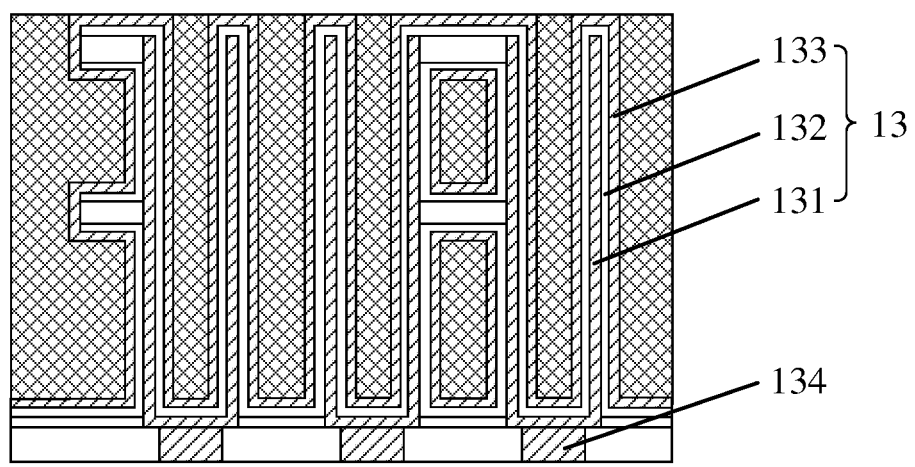
FIG. 5 is a schematic diagram of a storage capacitor layer according to an embodiment of the disclosure.

FIG. 1 is a schematic diagram of a memory according to an embodiment of the disclosure. FIG. 2 is a schematic diagram of a semiconductor structure according to an embodiment of the disclosure. FIG. 3 is a schematic diagram of a first base according to an embodiment of the disclosure. FIG. 4A is a schematic top view of a second base according to an embodiment of the disclosure. FIG. 4B is a detailed cross-sectional view of the second base along an A1-A2 direction of FIG. 4A according to an embodiment of the disclosure, and FIG. 4C is a detailed cross-sectional view of the second base along a B1-B2 direction of FIG. 4A according to an embodiment of the disclosure. FIG. 5 is a schematic diagram of a storage capacitor layer according to an embodiment of the disclosure.

The memory provided in the embodiments of the disclosure is further described in detail below with reference to FIG. 1, FIG. 2, FIG. 3, FIG. 4A to FIG. 4C, and FIG. 5.

As shown in FIG. 1 and FIG. 2, the memory 1 includes a plurality of semiconductor structures 10 stacked onto one another. Each of the plurality of semiconductor structures 10 includes a first base, a first integrated circuit layer, and a second base.

The first base 110 includes a peripheral circuit structure P1.

The first integrated circuit layer 14 is disposed on the first base 110. The first integrated circuit layer 14 is electrically connected to the peripheral circuit structure P1.

The second base 120 is disposed on the first integrated circuit layer 14. A first dielectric layer 21 is disposed between the first integrated circuit layer 14 and the second base 120. The second base 120 includes a storage circuit structure C1.

Each of the first base 110 and the second base 120 includes a semiconductor layer.

In some embodiments, as shown in FIG. 3 and FIG. 4B, the first base 110 includes a first oxide semiconductor layer L1, and the second base 120 includes a second oxide semiconductor layer L2.

Specifically, each of the material of the first oxide semiconductor layer and the material of the second oxide semiconductor layer includes at least one of indium oxide, tin oxide, In—Zn oxides, Sn—Zn oxides, Al—Zn oxides, In—Ga oxides, In—Ga—Zn oxides, In—Al—Zn oxides, In—Sn—Zn oxides, Sn—Ga—Zn oxides, Al—Ga—Zn oxides, or Sn—Al—Zn oxides.

However, the material of the first oxide semiconductor layer and the material of the second oxide semiconductor layer are not limited thereto. Each of the material of the first oxide semiconductor layer and the material of the second oxide semiconductor layer may further include In—Hf—Zn oxides, In-La—Zn oxides, In—Ce—Zn oxides, In—Pr—Zn oxides, In—Nd—Zn oxides, In—Sm—Zn oxides, In—Eu—Zn oxides, In—Gd—Zn oxides, In—Tb—Zn oxides, In—Dy—Zn oxides, In—Ho—Zn oxides, In—Er—Zn oxides, In—Tm—Zn oxides, In—Yb—Zn oxides, In—Lu—Zn oxides, and quaternary metal oxides such as In—Sn—Ga—Zn oxides, In—Hf—Ga—Zn oxides, In—Al—Ga—Zn oxides, In—Sn—Al—Zn oxides, In—Sn—Hf—Zn oxides, In—Hf—Al—Zn oxides, and the like.

In some embodiments, each of the material of the first oxide semiconductor layer and the material of the second oxide semiconductor layer may be selected from the materials at least including Indium (In) or Zinc (Zn). In particular, materials including In and Zn are preferred. In addition to the above elements, the materials further including a stabilizing agent Gallium (Ga) may be selected. The stabilizing agent may reduce the deviation of electrical characteristics of a finally formed transistor.

Optionally, each of the material of the first oxide semiconductor layer and the material of the second oxide semiconductor layer includes, but is not limited to, Indium Gallium Zinc Oxide (IGZO), for example, a material of which chemical formula is $InGaZnO_4$. A thickness of the IGZO may range from 10 nm to 500 nm, for example, 50 nm, 100 nm, 150 nm, 200 nm, 300 nm, 400 nm, or the like.

In some embodiments, a ratio among In, Ga, and Zn may be 1:1:1 or 2:2:1. However, the ratio is not limited thereto. The ratio among In, Ga, and Zn may further be other appropriate ratios.

It is to be understood that in some specific embodiments, the first oxide semiconductor layer and the second oxide semiconductor layer are doped materials. A doping agent with which the first oxide semiconductor layer and the second oxide semiconductor layer are doped includes more than one of boron, nitrogen, phosphorus and arsenic, or more than one of helium, neon, argon, krypton, and xenon. Alternatively, the doping agent is hydrogen. However, the doping agent is not limited thereto, and the doping agent may also be used in combination with the above materials according to requirements.

The formation of the first oxide semiconductor layer and the second oxide semiconductor layer may adopt sputtering, coating, printing, vapor deposition, PCVD, PLD, ALD, or MBE.

It is easy to deposit the first oxide semiconductor layer and the second oxide semiconductor layer compared with a silicon material. Therefore, when each of the material of the first base and the material of the second base includes the oxide semiconductor layer, it is very easy to form the memory structure including the plurality of semiconductor structures stacked onto one another. In some embodiments, the number of the semiconductor structures ranges from 2 to 500, for example, 10, 20, 50, 100, or 300.

It is to be noted that the formation process, the material and the thickness of the first oxide semiconductor layer adopted by the first base may be the same as or different from the formation process, the material and the thickness of the second oxide semiconductor layer adopted by the second base. Likewise, the material for doping the first oxide semiconductor layer may be the same as or different from the material for doping the second oxide semiconductor layer.

In some embodiments, a thickness of the first oxide semiconductor layer may be greater than a thickness of the second oxide semiconductor layer. Since the thickness of the first oxide semiconductor layer is relatively large, electric leakage of the entire device may be reduced. Since the thickness of the second oxide semiconductor layer is relatively small, the electron mobility of the memory device may be enhanced, and the performance of the device may be improved.

In some embodiments, in order to enhance the electron mobility of the memory device, the second oxide semiconductor layer may alternatively be designed to be an amorphous structure. The second oxide semiconductor layer in an amorphous state may easily obtain a flat surface, so that a scattered interface of the storage circuit structure manufactured using the second oxide semiconductor layer may be reduced. Therefore, the electron mobility of the memory device may be further enhanced.

Definitely, in some embodiments, the second oxide semiconductor layer in the amorphous state may further form a partial lattice structure. In this way, defects in the second oxide semiconductor layer may be reduced, so that the electron mobility of the memory device may be further enhanced.

In some embodiments, the second oxide semiconductor layer with the amorphous structure is obtained by, for example, reducing a deposition temperature for the second oxide semiconductor layer. For example, the deposition temperature is less than 150 degrees Celsius.

In some embodiments, when the first oxide semiconductor layer and the second oxide semiconductor layer are formed, the first oxide semiconductor layer and the second oxide semiconductor layer may also be doped by means of ion implantation or ion doping, and doping ions are, for example, boron, nitrogen, phosphorus, or arsenic. When the first oxide semiconductor layer includes doping ions, the conductivity of the first oxide semiconductor layer may be improved. It is to be noted that in order to guarantee the carrier mobility of the second oxide semiconductor layer and improve the conductivity of the first oxide semiconductor layer, a doping concentration in the second oxide semiconductor layer is less than or equal to a doping concentration in the first oxide semiconductor layer. If the doping concentration in the second oxide semiconductor layer is relatively large, the doping agent hinders the migration of carriers, so that the conductivity of the second oxide semiconductor layer is reduced. In some embodiments, the doping concentration in the first oxide semiconductor layer is, for example, $5 \times 10^{19}$ atmos/cm$^3$, and the doping concentration in the second oxide semiconductor layer is, for example, $5 \times 10^{18}$ atmos/cm$^3$.

In this embodiment, the peripheral circuit structure in each semiconductor structure is located on the first base and the storage circuit structure in each semiconductor structure is located on the second base. The first base and the second base are longitudinally distributed, and such a structure may significantly reduce the volume of the memory and enhance the array efficiency of the memory.

With reference to FIG. 2, it may be seen that each of the plurality of semiconductor structures 10 further includes a second dielectric layer 22 located between the first base 110 and the first integrated circuit layer 14, a first conductive plug 211 located in the first dielectric layer 21, and a second conductive plug 221 located in the second dielectric layer 22. The first integrated circuit layer 14 is electrically connected to the peripheral circuit structure P1 through the second conductive plug 221, and the first integrated circuit layer 14 is electrically connected to the storage circuit structure C1 through the first conductive plug 211.

It is to be understood that through the arrangement of the first integrated circuit layer, the first conductive plug and the second conductive plug, it is convenient to establish an electric connection between the peripheral circuit structure and the storage circuit structure subsequently. The first dielectric layer and the second dielectric layer may form a desirable electrical isolation effect in an area where the electric connection is not required between the peripheral circuit structure and the storage circuit structure.

Herein, each of the material of the first dielectric layer 21 and the material of the second dielectric layer 22 includes, but is not limited to, an oxide layer, a nitride layer, a metal oxide, a Spin-on Dielectric (SOD) layer or a combination thereof. Each of the material of the first conductive plug 211 and the material of the second conductive plug 221 includes, but is not limited to, tungsten or titanium nitride.

As shown in FIG. 3, the first base 110 further includes a gate layer 113, and a first source/drain layer 111 and a second source/drain layer 112. The first source/drain layer 111 is located on one side of the gate layer 113, and the second source/drain layer 112 is located on another side of the gate layer 113. The gate layer 113, the first source/drain layer 111, and the second source/drain layer 112 are located on the first oxide semiconductor layer L1. The first oxide semiconductor layer L1 serves as a channel layer of the peripheral circuit structure P1. The first source/drain layer 111 and the second source/drain layer 112 are electrically connected to the first integrated circuit layer 14 through the second conductive plug 221.

It may be understood that the gate layer 113, the first source/drain layer 111, and the second source/drain layer 112 belong to the peripheral circuit structure P1.

In this embodiment of the disclosure, when the material of the first oxide semiconductor layer is the IGZO, the peripheral circuit structure P1 has the advantages of being fast in signal transmission rate, low in cut-off current, and low in power consumption.

With reference to FIG. 3, it may be seen that the gate layer 113 may include a gate dielectric layer 113a, a metal layer 113b, and a capping layer 113c. A material of the gate dielectric layer 113a may be the same as the material of the first dielectric layer 21 and the material of the second dielectric layer 22, which is not described herein again. A material adopted by the metal layer 113b may include, but is not limited to, at least one of titanium nitride, tungsten or molybdenum. A material of the capping layer 113c includes, but is not limited to, silicon nitride.

Each of the material adopted by the first source/drain layer 111 and the material adopted by the second source/drain layer 112 may include, but is not limited to, Indium Tin Oxide (ITO), Molybdenum (Mo), Aluminum (Al), Titanium/gold (Ti/Au), Indium Gallium Zinc Oxide/Indium Tin Oxide (IGZO/ITO), or graphene. The first integrated circuit layer 14 includes one or more interconnection layers. The one or more interconnection layers integrate the peripheral circuit structure P1. A material adopted by the interconnection layer includes, but is not limited to, tungsten, titanium nitride, and the like.

In combination with FIG. 4A, FIG. 4B and FIG. 4C, it may be seen that the second base 120 further includes an isolation structure 125, a plurality of word lines 123 extending in a first direction, and a plurality of bit lines 124 extending in a second direction. The isolation structure 125 divides the second oxide semiconductor layer L2 into a plurality of discrete active areas 126. The plurality of word lines 123 penetrate through the plurality of discrete active areas 126 and isolation structure 125. Each of the plurality of discrete active areas 126 includes a first source/drain area 121 in the middle and second source/drain areas 122 on two sides. The plurality of bit lines 124 are electrically connected to respective first source/drain areas 121.

Herein, a material of the isolation structure 125 includes, but is not limited to, oxide, nitride, and the like.

In some embodiments, each of the plurality of word lines 123 includes a word line insulation layer 123a, an anti-diffusion barrier layer 123b, a metal layer 123c, and a word line cap layer 123d. A material of the word line insulation layer 123a may be the same or different from the material of the gate dielectric layer 113a. Herein, the material of the word line insulation layer 123a includes, but is not limited to, aluminum oxide ($Al_2O_3$), hafnium oxide ($HfO_2$), hafnium oxynitride (HfON), silicon oxide ($SiO_2$), zirconium oxide ($ZrO_2$), titanium oxide ($TiO_2$), hafnium lanthanide oxide (HfLaO), tantalum oxide ($Ta_2O_5$)), and other organic dielectric materials. A material of the anti-diffusion barrier layer 123b includes, but is not limited to, titanium nitride. A material of the metal layer 123c includes, but is not limited to, tungsten. A material of the word line cap layer 123d includes, but is not limited to, silicon nitride.

Each of the plurality of bit lines 124 includes an anti-diffusion barrier layer 124a, a metal layer 124b, and a bit line cap layer 124c. A material of the anti-diffusion barrier layer 124a includes, but is not limited to, titanium nitride. A material of the metal layer 124b includes, but is not limited to, tungsten. A material of the bit line cap layer 124c includes, but is not limited to, titanium nitride.

Optionally, the second base 120 may further include a bit line contact 127. The bit line contact 127 is configured to form an electric connection between the first source/drain areas 121 and the plurality of bit lines 124. A material of the bit line contact 127 includes, but is not limited to, titanium nitride or tungsten.

With reference to FIG. 2 and FIG. 5, it may be seen that each of the plurality of semiconductor structures 10 further includes a storage capacitor layer 13 configured to store information and a second integrated circuit layer 15 located above the storage capacitor layer 13. The storage capacitor layer 13 is located above the second base 120, and is electrically connected to the second source/drain areas 122. The second integrated circuit layer 15 is located above the storage capacitor layer 13, and electrically connected to the storage capacitor layer 13.

As shown in FIG. 5, the storage capacitor layer 13 includes a lower electrode 131, a dielectric material 132, and an upper electrode 133. Each of the material of the lower electrode 131 and the material of the upper electrode 133 may include one or more conductive materials, such as a doped semiconductor, conductive metal nitride, metal, metal silicide, conductive oxides, or a combination thereof, for example, titanium nitride, tungsten, tantalum nitride, and the like.

It may be understood that the material of the lower electrode 131 may be the same or different from the material of the upper electrode 133. A material of the dielectric material 132 includes, but is not limited to, nitride, oxide, metal oxide, or a combination thereof, for example, silicon nitride, silicon oxide, and the like. In some embodiments, the performance of the storage capacitor layer 13 may be improved using a high-K dielectric material.

In some embodiments, each of the plurality of semiconductor structures 10 further includes a node contact plug 134. The node contact plug 134 is configured to form an electric connection between the storage capacitor layer 13 and the second source/drain areas 122. A material of the node contact plug 134 includes, but is not limited to, titanium nitride, tungsten, and the like.

Herein, the second integrated circuit layer 15 may have a same composition as the first integrated circuit layer 14, which is not described herein again.

It may be understood that, the first source/drain area 121, the second source/drain areas 122, the plurality of word lines 123, and the plurality of bit lines 124 belong to the storage circuit structure C1.

When the material of the second oxide semiconductor layer L2 is Indium Gallium Zinc Oxide (IGZO), the storage circuit structure C1 has the advantages of being fast in access speed, low in cut-off current, and low in power consumption. Since the storage capacitor layer 13 has longer data hold time, usage requirements can be met by using the storage capacitor layer having low capacitance.

In an actual process, the second integrated circuit layer 15 is configured to form an electric connection between the peripheral circuit structure P1 and the storage circuit structure C1. Specifically, an electrical signal in the peripheral circuit structure P1 is transmitted to the first integrated circuit layer 14 via the second conductive plug 221, and then transmitted to the storage circuit structure C1 via the first conductive plug 211 or directly transmitted to the second integrated circuit layer 15. The electrical signal transmitted to the second integrated circuit layer 15 may be further transmitted to the storage circuit structure C1, so that the electric connection between the peripheral circuit structure P1 and the storage circuit structure C1 can be achieved.

In some embodiments, as shown in FIG. 1, the memory 1 further includes an isolation layer 17. The isolation layer 17 is located between any two semiconductor structures 10 of the plurality of semiconductor structures 10. A material of the isolation layer 17 may include, but is not limited to, a Spin-on Dielectric (SOD) layer, Tetraethyl Orthosilicate (TEOS), Borophosphosilicate Glass (BPSG), Silicon Dioxide ($SiO_2$). In some embodiments, a thickness of the isolation layer 17 ranges from 20 nm to 1000 nm, for example, 100 nm, 200 nm, 500 nm, or 800 nm. The isolation layer 17 is configured to form an electrical isolation effect between the adjacent semiconductor structures 10 of the plurality of semiconductor structures 10.

In this embodiment, the memory includes the plurality of semiconductor structures stacked onto one another. The integration of the memory may be effectively enhanced by means of stacking.

It may be understood that in the semiconductor structure 10 at the bottommost level of the memory 1, the semiconductor layer in the first base 110 may be made of silicon. In the art, the silicon may achieve a thicker thickness, so that the silicon is used to form the semiconductor layer, and the structure of the entire memory may be supported.

With reference to FIG. 1, it may be seen that the memory 1 further includes at least one connecting circuit 16. The at least one connecting circuit 16 is located outside the plurality of semiconductor structures 10, and configured to electrically connect the plurality of semiconductor structures 10 with each other.

In this embodiment of the disclosure, the integration of the memory may be effectively enhanced by means of stacking. In addition, in each of the plurality of semiconductor structures configured to form the memory, the peripheral circuit structure is disposed on the first base and the storage circuit structure is disposed on the second base. The first base and the second base are longitudinally distributed, so that the volume of the memory may be significantly reduced, and the array efficiency of the memory may be enhanced. Compared with a conventional structure, the memory in this embodiment of the disclosure has higher integration and array efficiency, and has a smaller dimension.

Figure 6:
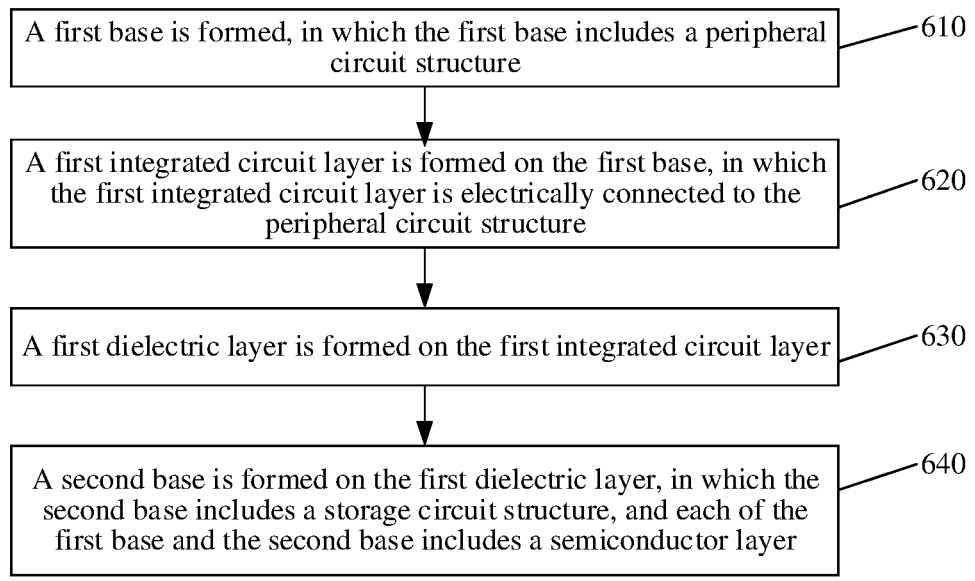
FIG. 6 is a block flowchart of a method for manufacturing a memory according to an embodiment of the disclosure.

An embodiment of the disclosure further provides a method for manufacturing a memory. For details, refer to FIG. 6. As shown in the figure, the method includes the following operations.

At operation 610, a first base is formed, in which the first base includes a peripheral circuit structure.

At operation 620, a first integrated circuit layer is formed on the first base, in which the first integrated circuit layer is electrically connected to the peripheral circuit structure.

At operation 630, a first dielectric layer is formed on the first integrated circuit layer.

At operation 640, a second base is formed on the first dielectric layer, in which the second base includes a storage circuit structure.

Each of the first base and the second base includes a semiconductor layer.

The method for manufacturing the memory provided in the embodiments of the disclosure is further described in detail below with reference to FIG. 7 to FIG. 14, FIG. 4A to FIG. 4C, and FIG. 5. FIG. 7 to FIG. 14 are process flow diagrams of a process for manufacturing a memory according to embodiments of the disclosure. FIG. 4A is a schematic top view of a second base according to an embodiment of the disclosure. FIG. 4B is a detailed cross-sectional view of the second base along an A1-A2 direction of FIG. 4A according to an embodiment of the disclosure, and FIG. 4C is a detailed cross-sectional view of the second base along a B1-B2 direction of FIG. 4A according to an embodiment of the disclosure. FIG. 5 is a schematic diagram of a storage capacitor layer according to an embodiment of the disclosure.

Figure 7:
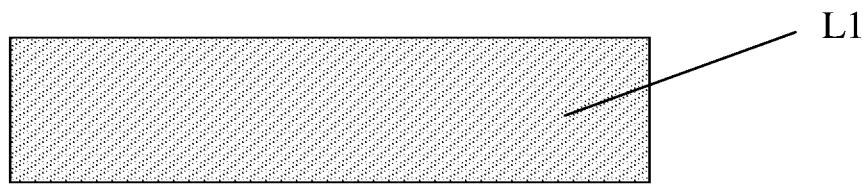
FIG. 7 is a first process flow diagram of a process for manufacturing a memory according to an embodiment of the disclosure.
Figure 8:
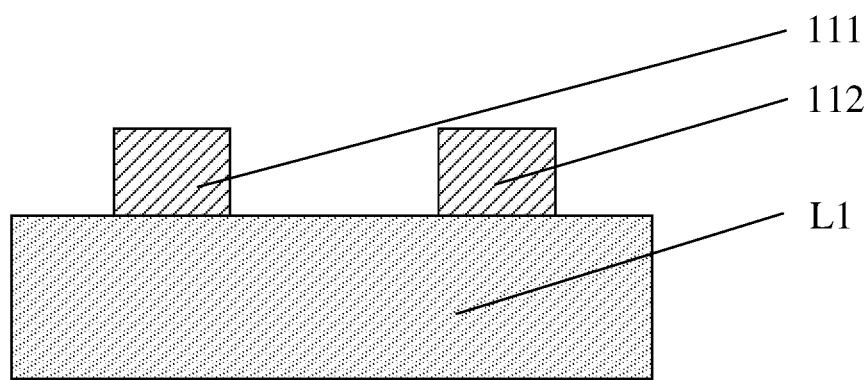
FIG. 8 is a second process flow diagram of a process for manufacturing a memory according to an embodiment of the disclosure.
Figure 9:
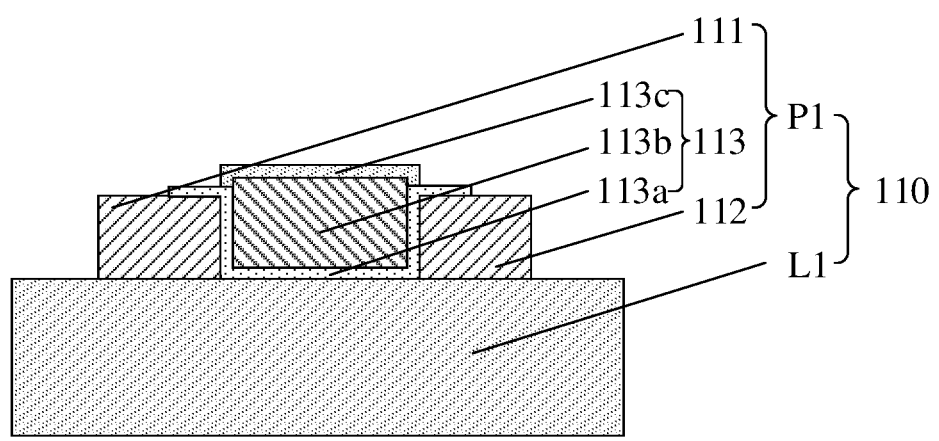
FIG. 9 is a third process flow diagram of a process for manufacturing a memory according to an embodiment of the disclosure.

The operation 610 is first performed. As shown in FIG. 7, FIG. 8 and FIG. 9, the first base 110 is formed. The first base 110 includes the peripheral circuit structure P1.

In some embodiments, the first base 110 includes a first oxide semiconductor layer L1, a gate layer 113, and a first source/drain layer 111 and a second source/drain layer 112. The first source/drain layer 111 is located on one side of the gate layer 113, and the second source/drain layer 112 is located on another side of the gate layer 113. The operation that the first base 110 is formed includes the following operations. The first oxide semiconductor layer L1 is formed, where the first oxide semiconductor layer L1 serves as a channel layer of the peripheral circuit structure P1, specifically with reference to FIG. 7. The first source/drain layer 111 and the second source/drain layer 112 are formed on the first oxide semiconductor layer L1, specifically with reference to FIG. 8. The gate layer 113 is formed between the first source/drain layer 111 and the second source/drain layer 112, specifically with reference to FIG. 9.

In the actual process, a material of the first oxide semiconductor layer includes at least one of indium oxide, tin oxide, In—Zn oxides, Sn—Zn oxides, Al—Zn oxides, In—Ga oxides, In—Ga—Zn oxides, In—Al—Zn oxides, In—Sn—Zn oxides, Sn—Ga—Zn oxides, Al—Ga—Zn oxides, or Sn—Al—Zn oxides.

However, the material of the first oxide semiconductor layer is not limited thereto. The material of the first oxide semiconductor layer may further include In—Hf—Zn oxides, In-La—Zn oxides, In—Ce—Zn oxides, In—Pr—Zn oxides, In—Nd—Zn oxides, In—Sm—Zn oxides, In—Eu—Zn oxides, In—Gd—Zn oxides, In—Tb—Zn oxides, In—Dy—Zn oxides, In—Ho—Zn oxides, In—Er—Zn oxides, In—Tm—Zn oxides, In—Yb—Zn oxides, In—Lu—Zn oxides, and quaternary metal oxides such as In—Sn—Ga—Zn oxides, In—Hf—Ga—Zn oxides, In—Al—Ga—Zn oxides, In—Sn—Al—Zn oxides, In—Sn—Hf—Zn oxides, In—Hf—Al—Zn oxides, and the like.

In some embodiments, the material of the first oxide semiconductor layer may be selected from a material at least including Indium (In) or Zinc (Zn). In particular, a material including In and Zn is preferred. In addition to the above elements, a material further including a stabilizing agent Gallium (Ga) may be selected. The stabilizing agent may reduce the deviation of electrical characteristics of a finally formed transistor.

Optionally, the material of the first oxide semiconductor layer includes, but is not limited to, IGZO, for example, a material of which chemical formula is $InGaZnO_4$. A thickness of the IGZO may range from 10 nm to 500 nm, for example, 50 nm, 100 nm, 150 nm, 200 nm, 300 nm, 400 nm, or the like.

In some embodiments, a ratio among In, Ga, and Zn may be 1:1:1 or 2:2:1, so that a C-axis aligned crystalline oxide semiconductor film layer may be formed, thereby enhancing electron mobility. However, the ratio is not limited thereto. The ratio among In, Ga, and Zn may further be other appropriate ratios.

It is to be understood that in some specific embodiments, the first oxide semiconductor layer is a doped material. A doping agent with which the first oxide semiconductor layer is doped includes more than one of boron, nitrogen, phosphorus and arsenic, or more than one of helium, neon, argon, krypton, and xenon. Alternatively, the doping agent is hydrogen. However, the doping agent is not limited thereto, and the doping agent may also be used in combination with the above materials according to requirements. When the doping agent is hydrogen, the first oxide semiconductor layer may be bonded with the hydrogen, so that part of the hydrogen becomes a donor, thereby generating electrons as carriers. Therefore, a concentration of the hydrogen may be properly reduced, so that a threshold voltage can be inhibited from drifting to a negative side.

The formation of the first oxide semiconductor layer may adopt sputtering, coating, printing, vapor deposition, PCVD, PLD, ALD, or MBE.

In some embodiments, the gate layer 113 includes a gate dielectric layer 113a, a metal layer 113b, and a capping layer 113c. The operation that the gate layer 113 is formed includes the following operations.

The gate dielectric layer 113a is formed on the first oxide semiconductor layer L1.

The metal layer 113b is formed on the gate dielectric layer 113a.

The capping layer 113c is formed on the metal layer 113b. For details, refer to FIG. 9.

In the actual process, a material of the gate dielectric layer 113a may include, but is not limited to, an oxide layer, a nitride layer, a metal oxide, a Spin-on Dielectric (SOD) layer or a combination thereof. A material adopted by the metal layer 113b may include, but is not limited to, at least one of titanium nitride, tungsten or molybdenum. A material of the capping layer 113c includes, but is not limited to, silicon nitride.

Each of the material adopted by the first source/drain layer 111 and the material adopted by the second source/drain layer 112 may include, but is not limited to, ITO, Mo, Al, Ti/Au, IGZO/ITO, or graphene.

The gate layer, the first source/drain layer and the second source/drain layer may be formed by means of one or more common thin film deposition processes.

It may be understood that the gate layer 113, the first source/drain layer 111, and the second source/drain layer 112 belong to the peripheral circuit structure P1.

In some embodiments, when the material of the first oxide semiconductor layer is the IGZO, the peripheral circuit structure P1 has the advantages of being fast in signal transmission rate, low in cut-off current, and low in power consumption.

Figure 10:
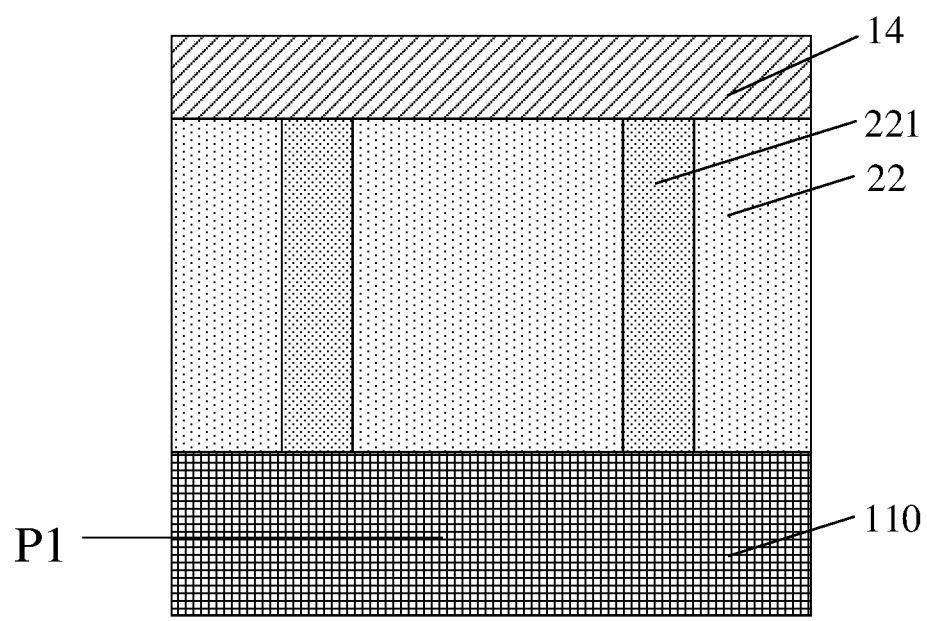
FIG. 10 is a fourth process flow diagram of a process for manufacturing a memory according to an embodiment of the disclosure.

Next, the operation 620 is performed. As shown in FIG. 10, the first integrated circuit layer 14 is formed on the first base 110. The first integrated circuit layer 14 is electrically connected to the peripheral circuit structure P1.

In some embodiments, the first integrated circuit layer 14 includes one or more interconnection layers. The one or more interconnection layers integrate the peripheral circuit structure P1. A material adopted by the interconnection layer includes, but is not limited to, tungsten, titanium nitride, and the like.

It is to be understood that before the first integrated circuit layer 14 is formed on the first base 110, the method further includes the following operations. A second dielectric layer 22 is formed on the first base 110; and a second conductive plug 221 is formed in the second dielectric layer 22. The first source/drain layer 111 and the second source/drain layer 112 are electrically connected to the first integrated circuit layer 14 through the second conductive plug 221. For details, refer to FIG. 10.

In this embodiment, the second conductive plug may be configured to form an electric connection between the peripheral circuit structure and the first integrated circuit layer. The second dielectric layer may form a desirable electrical isolation effect in an area where the electric connection is not required between the peripheral circuit structure and the first integrated circuit layer.

In the actual process, a material of the second dielectric layer 22 includes, but is not limited to, an oxide layer, a nitride layer, a metal oxide, a Spin-on Dielectric (SOD) layer or a combination thereof. A material of the second conductive plug 221 includes, but is not limited to, tungsten or titanium nitride.

The first integrated circuit layer, the second dielectric layer, and the second conductive plug may be formed by means of one or more thin film deposition processes. The various thin film deposition processes include, but are not limited to, a Chemical Vapor Deposition (CVD) process, a Plasma Enhanced Chemical Vapor Deposition (PECVD) process, an Atomic Layer Deposition (ALD) process, or a combination thereof.

Figure 11:
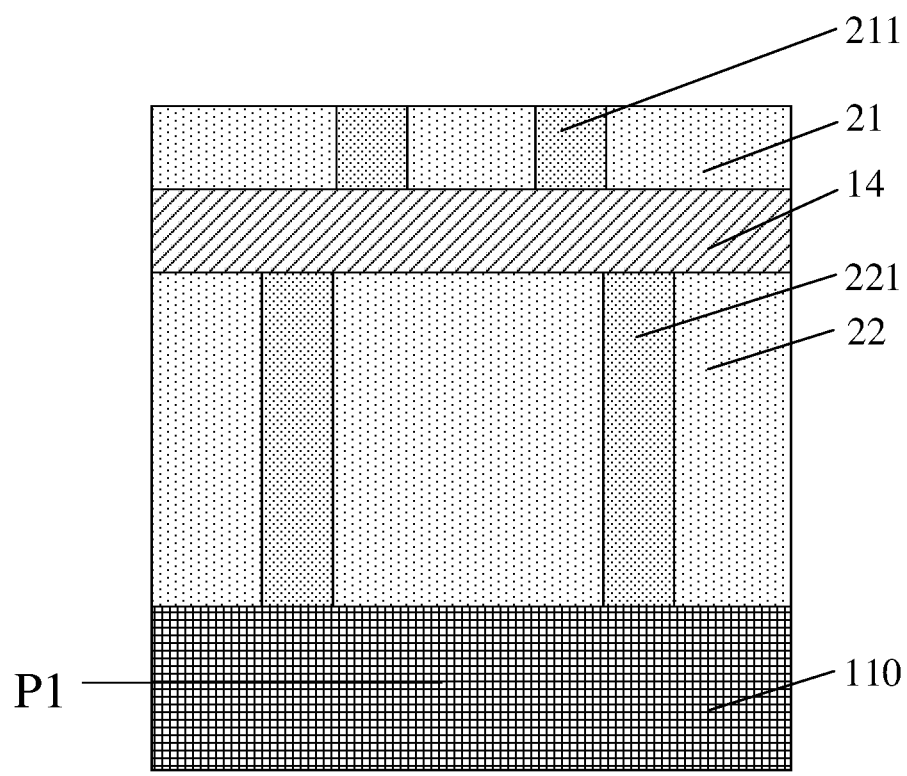
FIG. 11 is a fifth process flow diagram of a process for manufacturing a memory according to an embodiment of the disclosure.

Then, the operation 630 is performed. As shown in FIG. 11, the first dielectric layer 21 is formed on the first integrated circuit layer 14.

The material and formation process for the first dielectric layer 21 may be the same as the material and formation process for the second dielectric layer 22, which is not described herein again.

Figure 12:
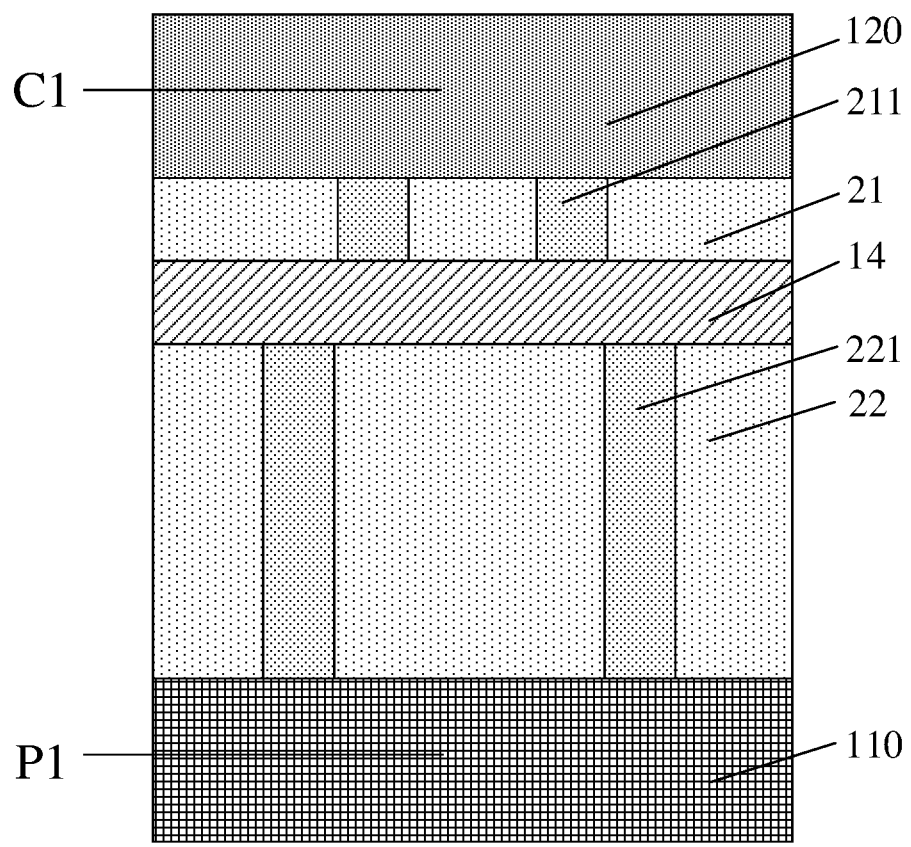
FIG. 12 is a sixth process flow diagram of a process for manufacturing a memory according to an embodiment of the disclosure.

Finally, the operation 640 is performed. As shown in FIG. 11 and FIG. 12, the second base 120 is formed on the first dielectric layer 21, in which the second base 120 includes the storage circuit structure C1. Each of the first base 110 and the second base 120 includes a semiconductor layer.

Optionally, before the second base 120 is formed on the first dielectric layer 21, the method further includes the following operation. A first conductive plug 211 is formed in the first dielectric layer 21, in which the first conductive plug 211 is configured to electrically connect the first integrated circuit layer 14 with the second base 120, as shown in FIG. 11. A material of the first conductive plug 211 may include, but is not limited to, tungsten or titanium nitride.

The first conductive plug is configured to form an electric connection between the first integrated circuit layer and the subsequently formed storage circuit structure. The first dielectric layer is configured to form a desirable electrical isolation effect in an area where the electric connection is not required.

In some embodiments, as shown in FIG. 4A, FIG. 4B and FIG. 4C, the second base 120 includes a second oxide semiconductor layer L2, an isolation structure 125, a plurality of word lines 123 extending in a first direction, and a plurality of bit lines 124 extending in a second direction. The operation that the second base 120 is formed includes the following operations. The second oxide semiconductor layer L2 and the isolation structure 125 are formed, where the isolation structure 125 divides the second oxide semiconductor layer into a plurality of discrete active areas 126. The plurality of word lines 123 penetrating through the plurality of discrete active areas 126 and the isolation structure 125 are formed, where each of the plurality of discrete active areas 126 126 includes a first source/drain area 121 in the middle and second source/drain areas 122 on two sides. The plurality of bit lines 124 are formed on the plurality of discrete active areas 126 and the isolation structure 125. The plurality of bit lines 124 are electrically connected to respective first source/drain areas 121.

Herein, a material of the isolation structure 125 includes, but is not limited to, oxide, nitride, and the like.

In some embodiments, as shown in FIG. 4B and FIG. 4C, each of the plurality of word lines 123 includes a word line insulation layer 123a, an anti-diffusion barrier layer 123b, a metal layer 123c, and a word line cap layer 123d. A material of the word line insulation layer 123a may be the same or different from the material of the gate dielectric layer 113a. Herein, the material of the word line insulation layer 123a includes, but is not limited to, $Al_2O_3$, $HfO_2$, HfON, $SiO_2$, $ZrO_2$, $TiO_2$, HfLaO, $Ta_2O_5$, and other organic dielectric materials. A material of the anti-diffusion barrier layer 123b includes, but is not limited to, titanium nitride. A material of the metal layer 123c includes, but is not limited to, tungsten. A material of the word line cap layer 123d includes, but is not limited to, silicon nitride.

With reference to FIG. 4B and FIG. 4C, each of the plurality of bit lines 124 includes an anti-diffusion barrier layer 124a, a metal layer 124b, and a bit line cap layer 124c. A material of the anti-diffusion barrier layer 124a includes, but is not limited to, titanium nitride. A material of the metal layer 124b includes, but is not limited to, tungsten. A material of the bit line cap layer 124c includes, but is not limited to, titanium nitride.

Optionally, the second base 120 may further include a bit line contact 127. The bit line contact 127 is configured to form an electric connection between the first source/drain areas 121 and the plurality of bit lines 124. A material of the bit line contact 127 includes, but is not limited to, titanium nitride or tungsten.

In the actual process, the isolation structure, the plurality of word lines, and the plurality of bit lines may be formed by means of one or more common thin film deposition processes. The various thin film deposition processes include, but are not limited to, a CVD process, a PECVD process, an ALD process, or a combination thereof.

Figure 13:
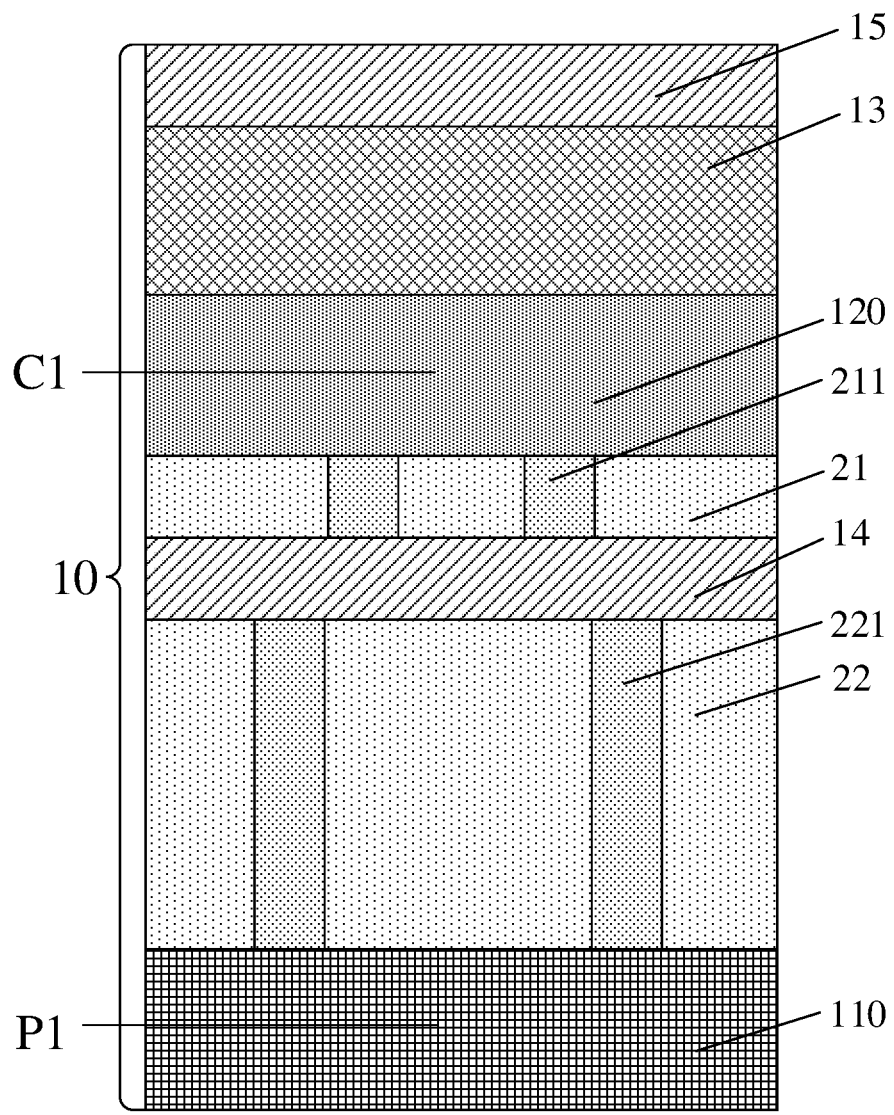
FIG. 13 is a seventh process flow diagram of a process for manufacturing a memory according to an embodiment of the disclosure.

In some embodiments, as shown in FIG. 5 and FIG. 13, it may be seen that the memory 1 further includes a storage capacitor layer 13 configured to store information and a second integrated circuit layer 15 located above the storage capacitor layer 13. The method further includes the following operations. The storage capacitor layer 13 is formed above the second base 120; and the second integrated circuit layer 15 is formed on the storage capacitor layer 13. The second integrated circuit layer 15 is electrically connected to the storage capacitor layer 13.

The storage capacitor layer 13 includes a lower electrode 131, a dielectric material 132, and an upper electrode 133. Each of the material of the lower electrode 131 and the material of the upper electrode 133 may include one or more conductive materials, such as a doped semiconductor, conductive metal nitride, metal, metal silicide, conductive oxides, or a combination thereof, for example, titanium nitride, tungsten, tantalum nitride, and the like. A material of the dielectric material 132 includes, but is not limited to, nitride, oxide, metal oxide, or a combination thereof.

In some embodiments, the memory 1 further includes a node contact plug 134. The node contact plug 134 is configured to form an electric connection between the storage capacitor layer 13 and the second source/drain areas 122. A material of the node contact plug 134 includes, but is not limited to, titanium nitride, tungsten, and the like.

Herein, the storage capacitor layer 13, the second integrated circuit layer 15 and the first integrated circuit layer 14 may have a same composition and formation process, which are not described herein again.

It may be understood that the first source/drain area 121, the second source/drain areas 122, the plurality of word lines 123, and the plurality of bit lines 124 belong to the storage circuit structure C1.

It may be understood that when the material of the second oxide semiconductor layer is the IGZO, the storage circuit structure C1 has the advantages of being fast in access speed, low in cut-off current, and low in power consumption. Since the storage capacitor layer has the advantages of a reduced update rate and prolonged data hold time, usage requirements can be met by using the storage capacitor layer having low capacitance.

In an actual process, the second integrated circuit layer 15 is configured to form an electric connection between the peripheral circuit structure P1 and the storage circuit structure C1. Specifically, an electrical signal in the peripheral circuit structure P1 is transmitted to the first integrated circuit layer 14 via the second conductive plug 221, and then transmitted to the storage circuit structure C1 via the first conductive plug 211 or directly transmitted to the second integrated circuit layer 15. The electrical signal transmitted to the second integrated circuit layer 15 may be further transmitted to the storage circuit structure C1, so that the electric connection between the peripheral circuit structure P1 and the storage circuit structure C1 can be achieved.

It may be understood that it is easy to deposit the oxide semiconductor layer compared with a silicon material. Therefore, when the first base includes the first oxide semiconductor layer and the second base includes the second oxide semiconductor layer, it is very easy to form the memory structure including the plurality of semiconductor structures stacked onto one another. In some embodiments, the number of the semiconductor structures included in the memory ranges from 2 to 500, for example, 10, 20, 50, 100, or 300.

It is to be noted that in this embodiment of the disclosure, the formation process, the material and the thickness of the first oxide semiconductor layer adopted by the first base may be the same as or different from the formation process, the material and the thickness of the second oxide semiconductor layer adopted by the second base. Likewise, the material with which the first oxide semiconductor layer is doped may be the same as or different from the material with which the second oxide semiconductor layer is doped.

In some embodiments, in the semiconductor structure 10 at the bottommost level of the memory 1, the semiconductor layer in the first base 110 may be made of silicon. In the art, the silicon may achieve a thicker thickness, so that the silicon is used to form the semiconductor layer, and the structure of the entire memory may be supported.

Figure 14:
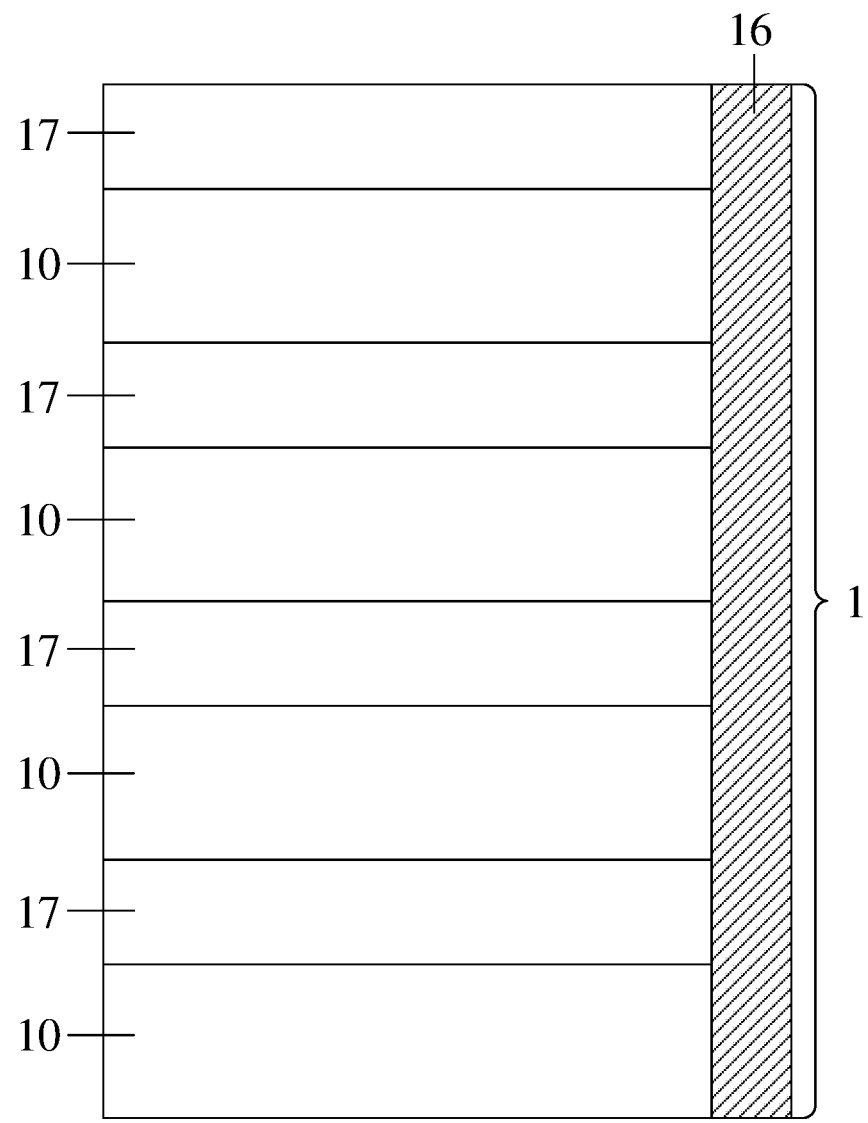
FIG. 14 is an eighth process flow diagram of a process for manufacturing a memory according to an embodiment of the disclosure.

In the actual process, as shown in FIG. 14, it may be seen that the memory 1 further includes at least one connecting circuit 16. The at least one connecting circuit 16 is located outside the plurality of semiconductor structures 10, and configured to electrically connect the plurality of semiconductor structures 10 with each other.

Optionally, the memory 1 further includes an isolation layer 17. The isolation layer 17 is located between any two semiconductor structures 10 of the plurality of semiconductor structures 10. A material of the isolation layer 17 may include, but is not limited to, an SOD layer, TEOS, BPSG, and $SiO_2$. In some embodiments, a thickness of the isolation layer 17 ranges from 20 nm to 1000 nm, for example, 100 nm, 200 nm, 500 nm, or 800 nm.

In this embodiment of the disclosure, the plurality of semiconductor structures are stacked onto one another to form the memory. The isolation layer located between the two adjacent semiconductor structures form effective electrical isolation between the two adjacent semiconductor structures. Compared with a conventional structure, the volume of the memory in this embodiment of the disclosure is significantly reduced. Therefore, the memory provided in this embodiment of the disclosure has the advantages of being high in integration and small in dimension.

It may be understood that, when the material of the first base and the material of the second base are IGZO, the peripheral circuit P1 has the advantages of being fast in signal transmission rate, low in cut-off current, and low in power consumption. The storage circuit structure C1 has the advantages of being fast in access speed, low in cut-off current, and low in power consumption. Since the storage capacitor layer has the advantages of a reduced update rate and prolonged data hold time, usage requirements can be met by using the storage capacitor layer having low capacitance.

In addition, in each of the plurality of semiconductor structures configured to form the memory, the peripheral circuit structure is disposed on the first base and the storage circuit structure is located on the second base. The first base and the second base are longitudinally distributed, so that the array efficiency of the memory can be enhanced, and the volume of the memory can be reduced.

In addition, through the arrangement of the first integrated circuit layer, the second integrated circuit layer, the first conductive plug and the second conductive plug in each of the plurality of semiconductor structures configured to form the memory, electric connections and data transmission can be achieved among the peripheral circuit structure, the storage circuit structure and the storage capacitor layer. Furthermore, the first dielectric layer and the second dielectric layer may form a desirable electrical isolation effect in an area where the electric connection is not required in each of the plurality of semiconductor structures.

Embodiments of the disclosure provide a memory and a method for manufacturing a memory. The memory includes a plurality of semiconductor structures stacked onto one another. Each of the plurality of semiconductor structures stacked onto one another includes: a first base, where the first base includes a peripheral circuit structure; a first integrated circuit layer, where the first integrated circuit layer is disposed on the first base and electrically connected to the peripheral circuit structure; and a second base, where the second base is disposed on the first integrated circuit layer. A first dielectric layer is disposed between the first integrated circuit layer and the second base. The second base includes a storage circuit structure. Each of the first base and the second base includes a semiconductor layer. The memory provided in this embodiment of the disclosure includes the plurality of semiconductor structures stacked onto one another, so that the integration of the memory may be effectively enhanced. In addition, the peripheral circuit structure in each of the plurality of semiconductor structures is located in the first base and the storage circuit structure in each of the plurality of semiconductor structures is located on the second base. The first base and the second base are distributed longitudinally, so that the volume of the memory may be significantly reduced, and the array efficiency of the memory may be enhanced. In addition, the first integrated circuit layer and the first dielectric layer are also successively disposed between the first base and the second base. The first integrated circuit layer is configured to form an electric connection between the peripheral circuit structure and the storage circuit structure, and the first dielectric layer is configured to form a desirable electrical isolation effect in areas where the electric connection is not required. Therefore, compared with a conventional structure, the memory provided in this embodiment of the disclosure has higher integration and array efficiency, and has a smaller dimension.

It is to be noted that the method for manufacturing the semiconductor device provided in this embodiment of the disclosure is applicable to the DRAM structure or other semiconductor devices, which is not limited herein. The embodiments of the method for manufacturing the semiconductor device provided in the disclosure and the embodiments of the semiconductor device belong to the same concept. The technical features in the technical solutions described in the embodiments may be arbitrarily combined with each other without conflict.

The above are only preferred embodiments of the disclosure, and are not used to limit the scope of protection of the disclosure. Any modifications, equivalent replacements and improvements and the like made within the spirit and principle of the disclosure shall be included within the scope of protection of the disclosure.

What is claimed is:

1. A memory, comprising:
   a plurality of semiconductor structures stacked onto one another, wherein each of the plurality of semiconductor structures comprises:
   a first base, wherein the first base comprises a peripheral circuit structure;
   a first integrated circuit layer, wherein the first integrated circuit layer is disposed on the first base and electrically connected to the peripheral circuit structure; and
   a second base, wherein the second base is disposed on the first integrated circuit layer, a first dielectric layer is disposed between the first integrated circuit layer and the second base, and the second base comprises a storage circuit structure,
   wherein each of the first base and the second base comprises a semiconductor layer;
   wherein the first base comprises a first oxide semiconductor layer, and the second base comprises a second oxide semiconductor layer; and
   wherein a thickness of the first oxide semiconductor layer is greater than a thickness of the second oxide semiconductor layer.

2. The memory of claim 1, wherein the second oxide semiconductor layer comprises an amorphous structure.

3. The memory of claim 1, wherein each of the plurality of semiconductor structures further comprises a second dielectric layer located between the first base and the first integrated circuit layer, a first conductive plug located in the first dielectric layer, and a second conductive plug located in the second dielectric layer, wherein the first integrated circuit layer is electrically connected to the peripheral circuit structure through the second conductive plug, and the first integrated circuit layer is electrically connected to the storage circuit structure through the first conductive plug.

4. The memory of claim 3, wherein the first base further comprises a gate layer, and a first source/drain layer and a second source/drain layer, wherein the first source/drain layer is located on one side of the gate layer, and the second source/drain layer is located on another side of the gate layer, wherein the gate layer, the first source/drain layer, and the second source/drain layer are located on the first oxide semiconductor layer, wherein the first oxide semiconductor layer serves as a channel layer of the peripheral circuit structure, and the first source/drain layer and the second source/drain layer are electrically connected to the first integrated circuit layer through the second conductive plug.

5. The memory of claim 3, wherein the second base further comprises an isolation structure, a plurality of word lines extending in a first direction, a plurality of bit lines extending in a second direction, wherein the isolation structure divides the second oxide semiconductor layer into a plurality of discrete active areas, wherein the plurality of word lines penetrate through the plurality of discrete active areas and the isolation structure, each of the plurality of discrete active areas comprises a first source/drain area in a middle and second source/drain areas on two sides, and the plurality of bit lines are electrically connected to respective first source/drain areas.

6. The memory of claim 5, wherein each of the plurality of semiconductor structures further comprises a storage capacitor layer configured to store information and a second integrated circuit layer located above the storage capacitor layer, wherein the storage capacitor layer is located above the second base, and is electrically connected to the second source/drain areas, and wherein the second integrated circuit layer is located above the storage capacitor layer, and is electrically connected to the storage capacitor layer.

7. The memory of claim 1, wherein a doping concentration in the second oxide semiconductor layer is less than or equal to a doping concentration in the first oxide semiconductor layer.

8. A method for manufacturing a memory, comprising:
   forming a first base, wherein the first base comprises a peripheral circuit structure;
   forming a first integrated circuit layer on the first base, wherein the first integrated circuit layer is electrically connected to the peripheral circuit structure;
   forming a first dielectric layer on the first integrated circuit layer; and
   forming a second base on the first dielectric layer, wherein the second base comprises a storage circuit structure,
   wherein each of the first base and the second base comprises a semiconductor layer;
   wherein the first base comprises a first oxide semiconductor layer, and the second base comprises a second oxide semiconductor layer; and
   wherein a thickness of the first oxide semiconductor layer is greater than a thickness of the second oxide semiconductor layer.

9. The method of claim 8, wherein the first base comprises a first oxide semiconductor layer, a gate layer, and a first source/drain layer and a second source/drain layer, wherein the first source/drain layer is located on one side of the gate layer, and the second source/drain layer is located on another side of the gate layer;
   wherein forming the first base comprises: forming the first oxide semiconductor layer, wherein the first oxide semiconductor layer serves as a channel layer of the peripheral circuit structure; forming the first source/drain layer and the second source/drain layer on the first oxide semiconductor layer; and forming the gate layer between the first source/drain layer and the second source/drain layer.

10. The method of claim 9, wherein before forming the first integrated circuit layer on the first base, the method further comprises: forming a second dielectric layer on the first base; and forming a second conductive plug in the second dielectric layer, wherein the first source/drain layer and the second source/drain layer are electrically connected to the first integrated circuit layer through the second conductive plug.

11. The method of claim 8, wherein the second base comprises a second oxide semiconductor layer, an isolation structure, a plurality of word lines extending in a first direction, and a plurality of bit lines extending in a second direction;
   wherein forming the second base comprises: forming the second oxide semiconductor layer and the isolation structure, wherein the isolation structure divides the second oxide semiconductor layer into a plurality of discrete active areas; forming the plurality of word lines penetrating through the plurality of discrete active areas and the isolation structure, wherein each of the plurality of discrete active areas comprises a first source/drain area in a middle and second source/drain areas on two sides; and forming the plurality of bit lines on the plurality of discrete active areas and the isolation structure, wherein the plurality of bit lines are electrically connected to respective first source/drain areas.

12. The method of claim 8, wherein the memory further comprises a storage capacitor layer configured to store information and a second integrated circuit layer located above the storage capacitor layer; and wherein the method further comprises: forming the storage capacitor layer above the second base; and forming the second integrated circuit layer on the storage capacitor layer, wherein the second integrated circuit layer is electrically connected to the storage capacitor layer.

13. The method of claim 8, wherein before forming the second base on the first dielectric layer, the method further comprises: forming a first conductive plug in the first dielectric layer, wherein the first conductive plug is configured to electrically connect the first integrated circuit layer with the second base.

14. The memory of claim 1, wherein the memory further comprises a plurality of isolation layers, wherein an isolation layer of the plurality of isolation layer is located between adjacent semiconductor structures.

15. The memory of claim 1, wherein the memory further comprises at least one connecting circuit located outside of the plurality of semiconductor structures, wherein the at least one connecting circuit connects the plurality of semiconductor structures.

16. A memory, comprising:
a plurality of semiconductor structures stacked onto one another, wherein each of the plurality of semiconductor structures comprises:
a first base, wherein the first base comprises a peripheral circuit structure;
a first integrated circuit layer, wherein the first integrated circuit layer is disposed on the first base and electrically connected to the peripheral circuit structure; and
a second base, wherein the second base is disposed on the first integrated circuit layer, a first dielectric layer is disposed between the first integrated circuit layer and the second base, and the second base comprises a storage circuit structure,
wherein each of the first base and the second base comprises a semiconductor layer;
wherein the first base comprises a first oxide semiconductor layer, and the second base comprises a second oxide semiconductor layer;
wherein a doping concentration in the second oxide semiconductor layer is less than a doping concentration in the first oxide semiconductor layer.

17. The memory of claim 16, wherein the second oxide semiconductor layer comprises an amorphous structure.

* * * * *